US007137241B2

(12) United States Patent
Martling et al.

(10) Patent No.: US 7,137,241 B2
(45) Date of Patent: Nov. 21, 2006

(54) TRANSITION DUCT APPARATUS HAVING REDUCED PRESSURE LOSS

(75) Inventors: Vincent C. Martling, Jupiter, FL (US); Zhenhua Xiao, Palm Beach Gardens, FL (US)

(73) Assignee: Power Systems Mfg, LLC, Jupiter, FL (US)

( * ) Notice: Subject to any disclaimer, the term of this patent is extended or adjusted under 35 U.S.C. 154(b) by 0 days.

(21) Appl. No.: 10/836,972

(22) Filed: Apr. 30, 2004

(65) Prior Publication Data

US 2005/0241321 A1 Nov. 3, 2005

(51) Int. Cl.
*F02C 3/14* (2006.01)
*F02C 7/18* (2006.01)

(52) U.S. Cl. .......................... 60/39.37; 60/752; 60/760

(58) Field of Classification Search ............... 60/39.37, 60/760, 752
See application file for complete search history.

(56) References Cited

U.S. PATENT DOCUMENTS 4,719,748 A 1/1988 Davis, Jr. et al.
4,903,477 A 2/1990 Butt
5,706,646 A 1/1998 Wilde et al.
6,134,877 A * 10/2000 Alkabie ....................... 60/800
6,494,044 B1 12/2002 Bland
6,546,731 B1 4/2003 Alkabie et al.
6,568,187 B1 * 5/2003 Jorgensen et al. ............ 60/752

FOREIGN PATENT DOCUMENTS

JP 03-1015 * 1/1991

* cited by examiner

*Primary Examiner*—Ted Kim
(74) *Attorney, Agent, or Firm*—Shook, Hardy & Bacon L.L.P.

(57) ABSTRACT

A gas turbine transition duct having a reduced pressure loss is disclosed. The transition duct of the preferred embodiment comprises a panel assembly having a first panel fixed to a second panel and a mounting assembly for securing the transition duct to a turbine inlet. The first panel includes a means for augmenting the heat transfer from the first panel while the second panel includes a plurality of first cooling holes for directing cooling air through the second panel. Specific details are provided regarding the first cooling holes and multiple embodiments are disclosed for the heat transfer augmentation of the transition duct first panel.

21 Claims, 5 Drawing Sheets

TRANSITION DUCT APPARATUS HAVING REDUCED PRESSURE LOSS

TECHNICAL FIELD

This invention primarily applies to gas turbine engines used to generate electricity and more specifically to a transition duct for directing hot combustion gases from a combustor to a turbine inlet.

BACKGROUND OF THE INVENTION

Operators of gas turbine engines used in generating electricity at powerplants desire to have the most efficient operations possible in order to maximize their profitability and limit the amount of emissions produced and excess heat lost. In addition to maintenance costs, one of the highest costs associated with operating a gas turbine at a powerplant, is the cost of the fuel burned in the gas turbine, either gas, liquid, or coal. Increasing the efficiency of the gas turbine will result in an increase in electrical generation capacity for a given amount of fuel burned. Alternatively, if additional electrical generation is not possible or desired, the required level of electricity can be generated at a lower fuel consumption rate. Under either scenario the powerplant operator achieves a significant cost savings while simultaneously increasing the powerplant efficiency.

A significant way to increase the gas turbine engine performance is to provide the turbine with a higher supply pressure from the combustor. For a combustion system having a known pressure loss, this can be accomplished by reducing the pressure losses to the air that occurs in the region between the compressor outlet and the combustion chamber. One specific component in this region is the transition duct, which connects the combustion chamber to the turbine inlet, thereby transferring the hot combustion gases to the turbine. These gases can often times reach temperatures upwards of 3000 degrees Fahrenheit. Therefore, in order to provide a transition duct capable of extended exposure to these elevated temperatures, careful attention must be paid to the cooling of the transition duct. Often times cooling air is not used in the most efficient manner with regards to limiting the amount of pressure loss that occurs when cooling the transition duct. As a result an unnecessary drop in supply pressure to the turbine occurs, yielding a lower turbine efficiency and engine performance.

Referring to FIG. 1, a transition duct 10 of the prior art is shown in partial cross section. Transition duct 10 comprises an inner wall 11, an impingement sleeve 12, thereby forming a cooling channel 13 therebetween. Impingement sleeve 12 includes a plurality of cooling holes 14 that allow cooling air, which is indicated by the arrows, to enter cooling channel 13 and impinge along inner wall 11 to cool the transition duct. Directing a large plenum of air through cooling holes 14 causes a substantial pressure drop to occur in the air flow. It has been estimated, that for the gas turbine in which transition duct 10 is designed to operate, approximately 1.5% of the total air supply pressure from the compressor is lost due to the geometry of impingement sleeve 12 including cooling holes 14. Utilizing an alternate cooling configuration for transition duct 10 can recover a majority of this pressure loss.

The present invention seeks to overcome the shortfalls of the prior art by providing a transition duct that utilizes an improved cooling configuration that has a substantially lower pressure loss than that of the prior art.

SUMMARY AND OBJECTS OF THE INVENTION

A gas turbine transition duct having reduced pressure loss comprises a panel assembly comprising a first panel and a second panel fixed together thereby forming a duct having an inner surface, an outer surface, and a thickness therebetween. Both first and second panels are each formed from a single sheet of metal and the resulting duct has a generally cylindrical inlet end and a generally rectangular exit end. A plurality of first holes is preferably located in the second panel for providing cooling through the thickness of the second panel, while a means for augmenting heat transfer is included along at least the first panel. The transition duct is secured to the inlet of a turbine by a mounting assembly and in operation is in fluid communication with the turbine as well as a combustor.

It is an object of the present invention to provide a gas turbine transition duct that creates a lower pressure loss to the cooling air.

It is another object of the present invention to provide multiple configurations for augmenting the heat transfer along the transition duct.

In accordance with these and other objects, which will become apparent hereinafter, the instant invention will now be described with particular reference to the accompanying drawings.

DETAILED DESCRIPTION OF THE PREFERRED EMBODIMENT

Figure 4:
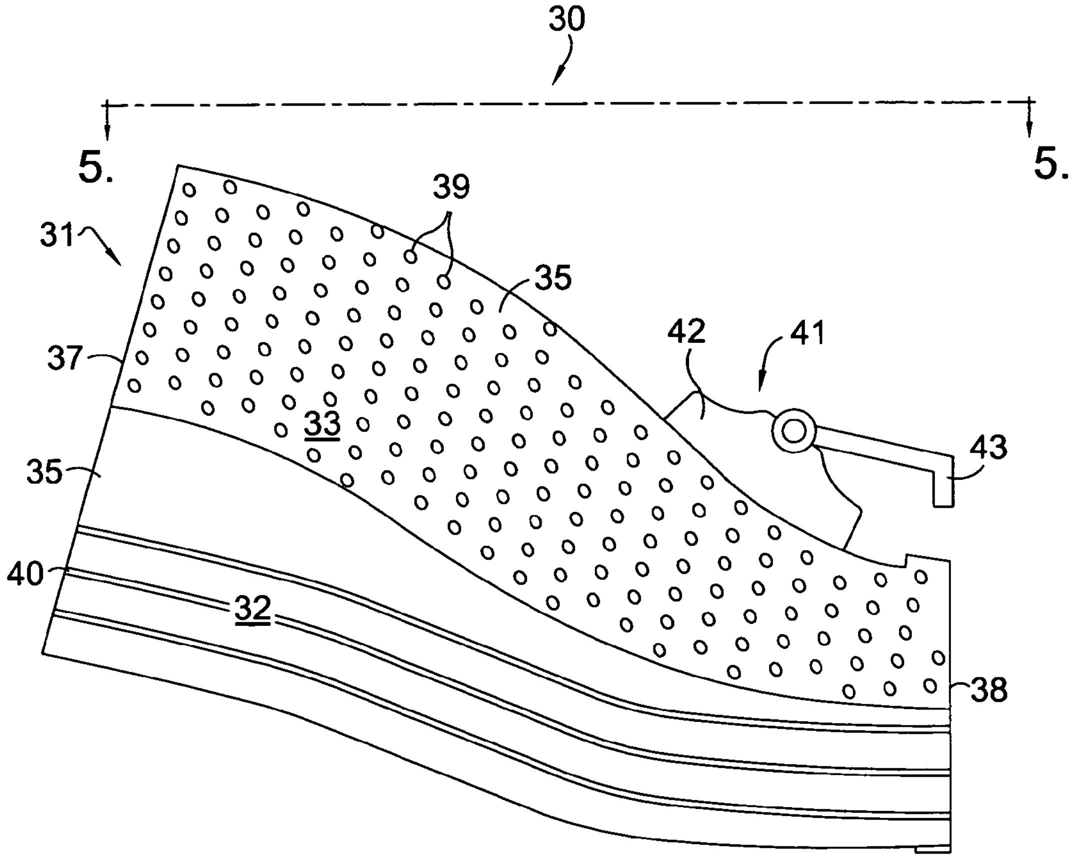
FIG. 4 is a side elevation view with a partial cut-away of a gas turbine transition duct in accordance with the preferred embodiment of the present invention.
Figure 5:
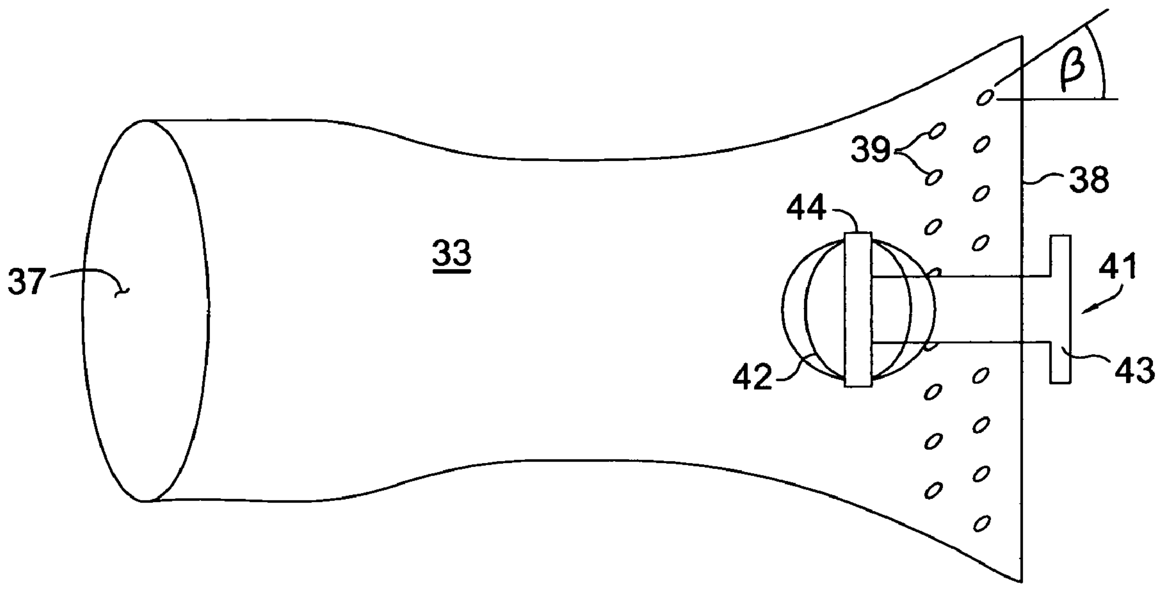
FIG. 5 is a top elevation view of a gas turbine transition duct in accordance with the present invention.

A gas turbine transition duct having reduced pressure loss is disclosed in detail in FIGS. 2–5. Transition duct 30 comprises a panel assembly 31, where panel assembly 31 further comprises a first panel 32 and a second panel 33, each of which are formed from a single sheet of metal. First panel 32 is fixed to second panel 33 by a means such as welding along a seam 50 to form a duct having an inner surface 34 and an outer surface 35, thereby forming a thickness 36 therebetween, a generally cylindrical inlet end 37, and a generally rectangular exit end 38. In order to withstand the elevated operating temperatures from the hot combustion gases passing through the transition duct, duct 30 is typically a high temperature alloy with thickness 36 at least 0.062 inches. In addition to panel assembly 31, transition duct 30 also comprises a plurality of first holes 39 located in second panel 33 of panel assembly 31. First holes 39 provide cooling, typically with air, through thickness 36 to the upper half of transition duct 30. In order to use this air most efficiently and in order to minimize the pressure loss associated with this type of cooling, first holes 39 in second panel 33 are preferably oriented at a first angle α relative to outer wall 35 such that first holes 39 are oriented generally towards generally rectangular exit end 38. Depending on the amount of surface area for which cooling is required, first angle α of first holes 39 can range between 10 and 75 degrees. Orienting first holes 39 at a surface angle such as that described herein allows for a longer hole, such that the hole covers a greater area of second panel 33 and uses the same amount of cooling air over a greater area before discharging it into transition duct 30. Therefore, less cooling air is required than if first holes 39 were oriented perpendicular to outer surface 35. The cooling effectiveness of first holes 39 can be further improved when first holes 39 are further oriented at a second angle β relative to generally rectangular exit end 38 as shown in FIG. 5. In order to maximize the efficiency of the cooling air passing through first holes 39 having a second angle β, it is preferred that second angle β ranges up to 80 degrees.

One skilled in the art of gas turbine combustor cooling will understand that the amount of cooling air, spacing of first holes 39, and diameter of first holes 39, will be dependent upon the desired metal temperature of transition duct 30 as well as the amount of air that can be consumed for cooling without compromising combustion or turbine performance.

Figure 1:
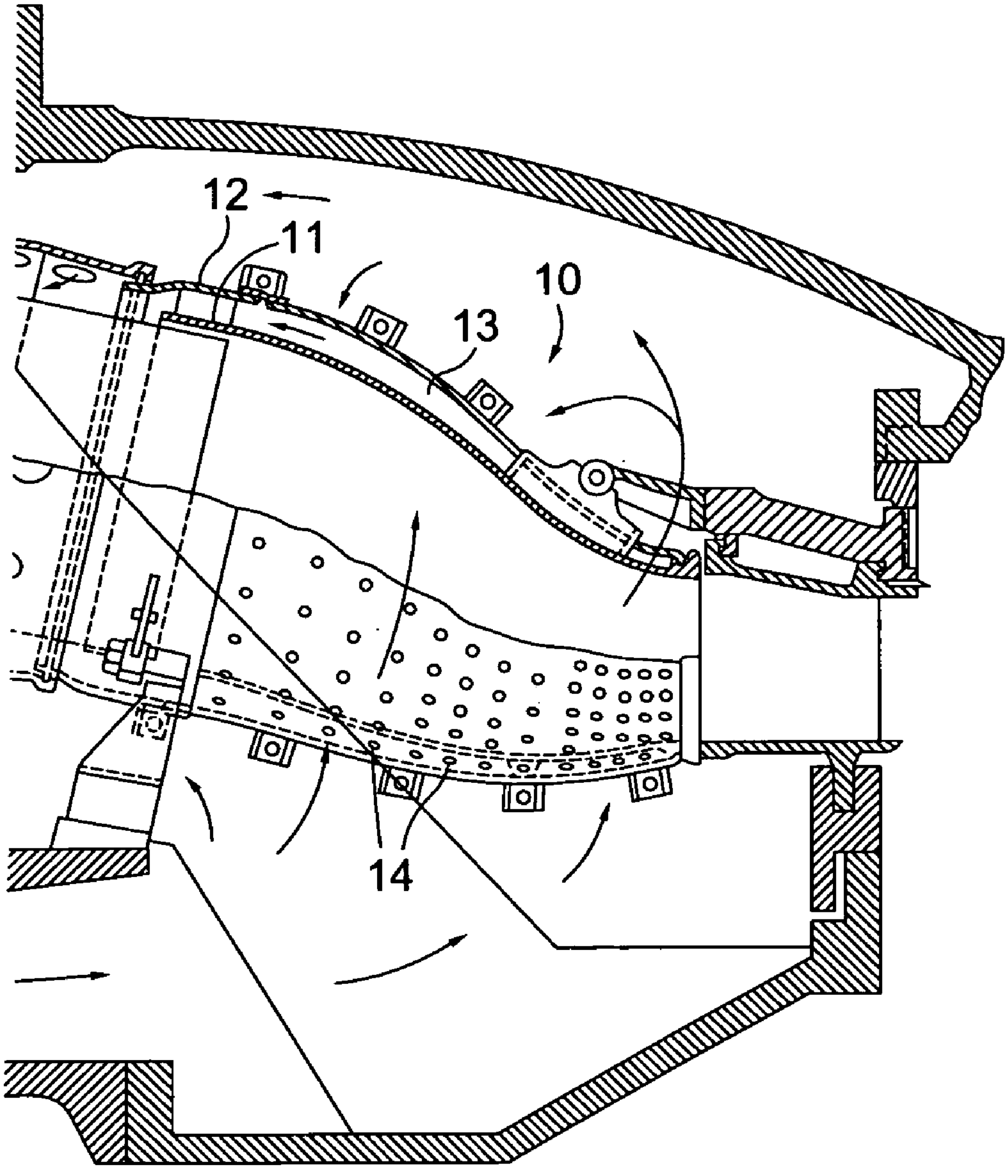
FIG. 1. PRIOR ART
FIG. 1 is a cross section view of a gas turbine transition duct of the prior art.
Figure 2:
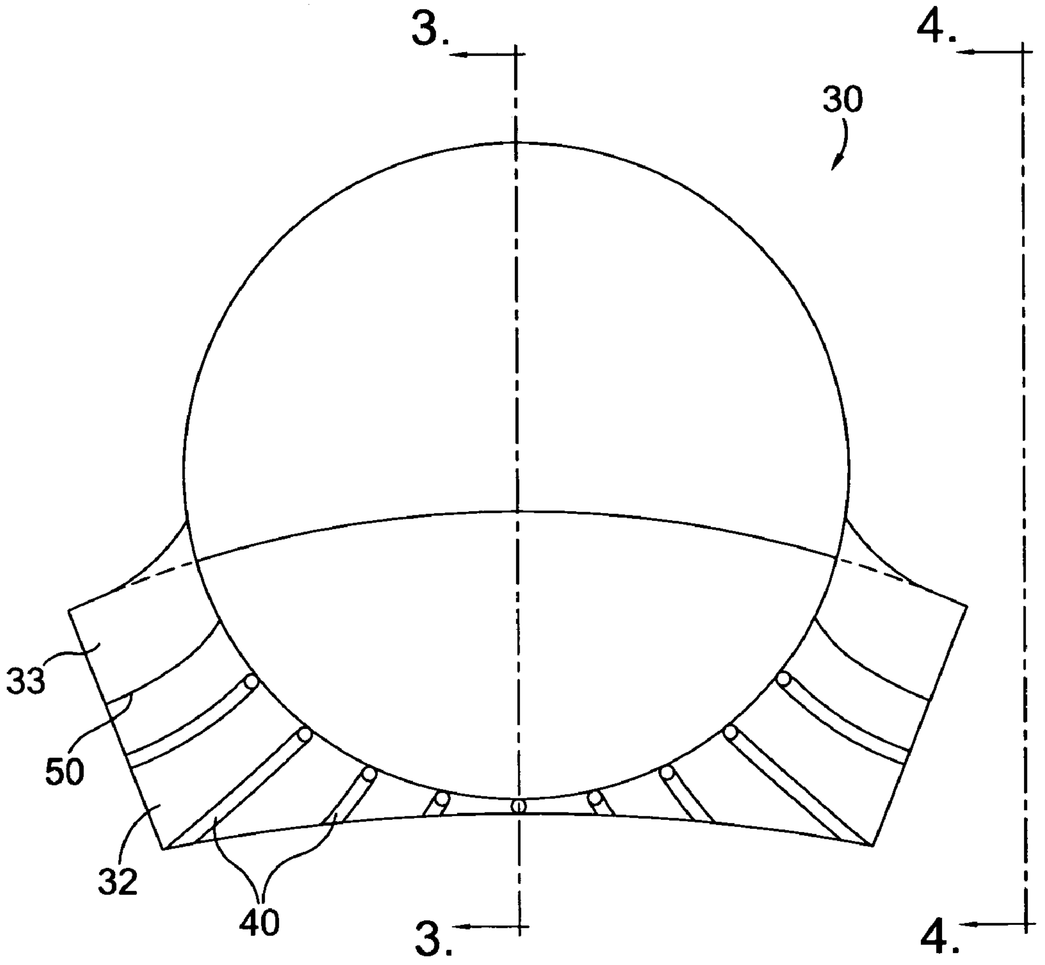
FIG. 2 is a front elevation view of a gas turbine transition duct in accordance with the preferred embodiment of the present invention.
Figure 3:
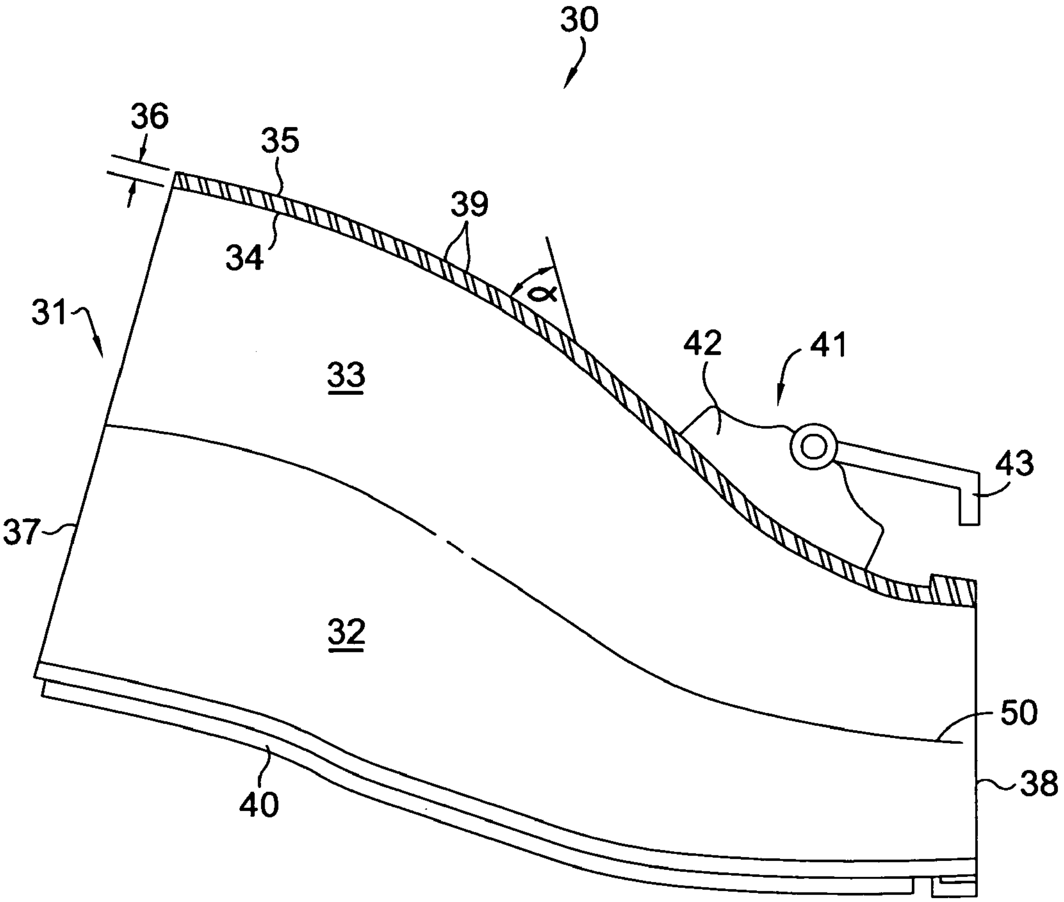
FIG. 3 is a full cross section view of a gas turbine transition duct in accordance with the preferred embodiment of the present invention.

For a gas turbine engine that employs a plurality of transition ducts, the ducts are typically located within a plenum that contains air from the compressor (see FIG. 1). In applicant's co-pending U.S. patent application entitled, Apparatus and Method for Reducing the Heat Rate of a Gas Turbine Powerplant, a turning vane assembly is disclosed that more effectively directs the flow of air from the engine compressor directly towards a transition duct. It has been determined that an impingement sleeve surrounding a transition duct that is used to inject the cooling airflow onto a transition duct walls is not necessary if the airflow is accurately directed towards first panel 32 of a transition duct. Furthermore, the airflow that contacts first panel 32 can more efficiently cool first panel 32 and second panel 33 when passing over a means for augmenting the heat transfer through first panel 32. The preferred means for augmenting the heat transfer along at least first panel 32 comprises a plurality of strips 40, which are secured to outer surface 35 and have a raised surface. The addition of strips 40 increases the surface area of outer surface 35 that is at an elevated temperature and requires cooling by the passing air. Strips 40 can be fabricated from sheet metal or wire and have a variety of geometric configurations, including rectangular and/or circular. The strips 40 may be oriented a such to maximize the cooling efficiency. The metal strips are then bonded to outer surface 35 of transition duct 30 by a means such as brazing or welding. Alternatively, as spray coating processes and technology have continued to advance, strips 40 can also be fabricated from a metal spray that bonds directly to outer surface 35. Due to the fact that the air from the compressor is being directed at first panel 32 from the centerline of the engine and will flow around first panel 32 to second panel 33, it is preferred that strips 40 are spaced generally circumferentially around at least first panel 32 and extend over a majority of the length of at least first panel 32 as shown in FIGS. 2 and 4.

Transition duct 30 also comprises a mounting assembly 41 for securing transition duct 30 to an inlet of a turbine. In the preferred embodiment, mounting assembly 41 includes a base 42 and mounting plate 43, which is hinged to base 42 by bolt 44.

Due to the high operating temperatures experienced along transition duct 30, it is imperative that all of the surfaces are adequately cooled. Air exiting from a compressor is directed towards outer surface 35 of first panel 32. The air loses some of its velocity while traveling around first panel 32 and over strips 40. In order to maintain effective wall cooling for second panel 33, as a result of the reduced velocity, first cooling holes 39 are necessary. In this arrangement, a small amount of air is sacrificed from the combustion process, but a majority of the air supply pressure from the compressor is maintained, when compared to the prior art design.

While the invention has been described in what is known as presently the preferred embodiment, it is to be understood that the invention is not to be limited to the disclosed embodiment but, on the contrary, is intended to cover various modifications and equivalent arrangements within the scope of the following claims.

We claim:

1. A gas turbine transition duct having reduced pressure loss, said transition duct having a generally longitudinal axis comprising:

a panel assembly comprising:

a lower first panel formed from a single sheet of metal;

an upper second panel formed from a single sheet of metal;

said first panel fixed to said second panel thereby forming a duct having an inner surface, an outer surface, a thickness therebetween, a generally cylindrical inlet end, and a generally rectangular exit end;

a plurality of first holes located in said second panel;

a means for augmenting heat transfer along at least said first panel of said panel assembly wherein said means for augmenting heat transfer comprises a plurality of longitudinal strips having a raised surface with said plurality of strips secured to said transition duct outer surface substantially along the generally directionally axis; and, a mounting assembly for securing said transition duct to an inlet of a turbine.

2. The gas turbine transition duct of claim 1 wherein said first panel is fixed to said second panel by a means such as welding.

3. The gas turbine transition duct of claim 1 wherein said thickness is at least 0.062 inches.

4. The gas turbine transition duct of claim 1 wherein said plurality of first holes in said second panel are oriented at a first angle α relative to said outer surface and generally towards said generally rectangular exit end.

5. The gas turbine transition duct of claim 4 wherein said first angle α of said plurality of first holes is between 10 and 75 degrees.

6. The gas turbine transition duct of claim 4 wherein said plurality of first holes in said second panel are further oriented at a second angle β relative to said generally rectangular exit end.

7. The gas turbine transition duct of claim 6 wherein said second angle β of said plurality of first holes is up to 80 degrees.

8. The gas turbine transition duct of claim 1 wherein said plurality of strips is fabricated from sheet metal and have a generally rectangular cross section.

9. The gas turbine transition duct of claim 1 wherein said plurality of strips is fabricated from wire and have a generally cylindrical cross section.

10. The gas turbine transition duct of claim 1 wherein said plurality of strips is fabricated from a metal spray that bonds directly to said transition duct outer surface wall.

11. A gas turbine transition duct of claim 1 wherein said strip are spaced generally cirumferentiall around at least said first panel of said transition duct.

12. A gas turbine transition duct having reduced pressure loss, said transition duct having a generally longitudinal axis comprising:

a panel assembly comprising:

a lower first panel formed from a single sheet of metal;

an upper second panel formed from a single sheet of metal;

said first panel fixed to said second panel thereby forming a duct having an inner surface, an outer surface, a thickness therebetween, a generally cylindrical inlet end, and a generally rectangular exit end;

a plurality of first holes located in said second panel;

a plurality of longitudinal strips having a raised surface with said plurality of strips secured to the first panel of said transition duct outer surface substantially along the generally longitudinal axis; and, a mounting assembly for securing said transition duct to an inlet of a turbine.

13. The gas turbine transition duct of claim 12 wherein said plurality of first holes in said second panel are oriented at a first angle α relative to said outer surface.

14. The gas turbine transition duct of claim 13 wherein said first angle α of said plurality of first holes is between 10 and 75 degrees.

15. The gas turbine transition duct of claim 13 wherein said plurality of first holes in said second panel are further oriented at a second angle β relative to said generally rectangular exit end.

16. The gas turbine transition duct of claim 15 wherein said second angle β of said plurality of first holes is up to 80 degrees.

17. The gas turbine transition duct of claim 12 wherein said plurality of strips is fabricated from sheet metal and have a generally rectangular cross section.

18. The gas turbine transition duct of claim 12 wherein said plurality of strips is fabricated from wire and have a generally cylindrical cross section.

19. The gas turbine transition duct of claim 12 wherein said plurality of strips is fabricated from a metal spray that bonds directly to said transition duct outer wall.

20. The gas turbine transition duct of claim 12 wherein said strips are spaced generally circumferentially around at least said first panel of said transition duct.

21. A gas turbine transition duct having reduced pressure loss, said transition duct having a generally longitudinal axis comprising:

a panel assembly comprising:

a lower first panel formed from a single sheet of metal;

an upper second panel formed from a single sheet of metal;

said first panel fixed to said second panel thereby forming a duct having an inner surface, an outer surface, a thickness therebetween, a generally cylindrical inlet end, and a generally rectangular exit end;

a plurality of first holes located in said second panel;

a plurality of substantially longitudinal strips secured to said first panel substantially along the generally longitudinal axis, each of said strips having a raised surface, which is directly exposed to cooling air passing along said first panel for the purpose of improving heat transfer characteristics of said panel; and, a mounting assembly for securing said transition duct to an inlet of a turbine.

* * * * *